United States Patent [19]

Paciullo

[11] Patent Number: 5,007,375
[45] Date of Patent: Apr. 16, 1991

[54] LITTER BOX ENVELOPES

[75] Inventor: Francis P. Paciullo, Middlesex, N.J.

[73] Assignee: Colgate-Palmolive Co., Piscataway, N.J.

[21] Appl. No.: 509,118

[22] Filed: Apr. 16, 1990

[51] Int. Cl.⁵ ............................................ A01K 45/00
[52] U.S. Cl. .................................................. 119/170
[58] Field of Search .................... 119/1; 604/290, 292, 604/385.1

[56] References Cited

U.S. PATENT DOCUMENTS

| 4,819,580 | 4/1989 | Foldes | 119/1 |
| 4,902,283 | 2/1990 | Rojko et al. | 604/292 X |

FOREIGN PATENT DOCUMENTS

| 2196820 | 3/1974 | France | 604/292 |
| 89/03174 | 4/1989 | World Int. Prop. O. | 119/1 |

Primary Examiner—Gene Mancene
Assistant Examiner—R. Thomas Price
Attorney, Agent, or Firm—Michael J. McGreal; Murray M. Grill; Robert C. Sullivan

[57] ABSTRACT

A litter box envelope comprising a top sheet and a bottom sheet bonded to each other along the side edges and one end edge of each so as to leave an open end for receiving a litter box therein; a facing sheet of tear resistant, claw and scratch-proof material of non-woven nylon fibers, which are spun-bonded and heat treated. The facing sheet is adapted to receive litter material therein.

2 Claims, 2 Drawing Sheets

LITTER BOX ENVELOPES

BACKGROUND OF THE INVENTION

1. Field of the Invention

This invention relates to the class of animal husbandry and, more particularly, to a disposable litter box envelope especially adapted for use by cats and/or household pets.

2. Description of the Prior Art

In the past, cats and other animals kept indoors have been trained to use litter boxes. The simplest of these was the common sandbox. Thereafter, slightly more sophisticated litter was substituted for sand. Such litter has been formed of sawdust, clay, ground stone, etc., which may have been treated with perfumes, deodorants and reactants to minimize odors which emanate from both solid and liquid waste.

Fairly recently litter pads have been developed which have been marketed primarily as liners for litter boxes. These liners have the general construction of diapers and have a base or bottom sheet of fluid impervious material, a pad (usually of absorbent material, such as wood fluff) and a top sheet of thin material, such as a woven or non-woven sheet, sometimes of hydrophilic material, but usually of hydrophobic material. These litter pads are designed to be used in existing litter boxes, but have the disadvantage that they must be first separately fastened in the litter box and, secondly, that they are usually oversize, thus, having a relatively difficult fit. As such, the area of effectiveness of the pad is reduced in comparison to its size and, further, the effective area of the litter box is decreased due to creases, folds and bumps caused by misfits. In addition, the extra size of these pads increases costs.

While the use of pads provides some means for disposing of the used litter and to-be-discarded pad, the pad itself is cumbersome to handle, as well as being somewhat unpleasant to handle. Furthermore, even with the use of litter, some waste comes into contact with the litter box, which, of course, must then be washed or otherwise cleaned.

In U.S. Pat. No. 4,640,225 to P. Yananton, issued Feb. 3, 1987, for "Odorless Animal Litter Unit," there is disclosed such a pad which is further provided above the top sheet with a "claw resistant" mesh. Such a pad can be used with variuos types of litter and in various types of litter boxes. However, in any event, there is no means for eliminating contact of the waste with the litter box and the necessity of periodic cleaning.

Litter box liners have been made from a single sheet of waterproof material, which has been spread over the litter box before placement of the litter material therein. Trash bags formed of sheet or film material have been placed over a litter box much in the same manner and, alternatively, the litter box has been placed within the trash bag in a pillowcase or envelope-like manner. Such attempts at litter box liners are generally unsuccessful because the sheet material is very easily torn and not at all claw-proof. Simple scratching turns these liners into shreds.

OBJECTS OF THE INVENTION

It is, therefore, the primary object of the invention to overcome the disadvantages of the prior art litter box liners by providing a litter box envelope that is inexpensive and simple of manufacture, easy to use, yet, which is ideally tear-resistant and claw-proof.

SUMMARY OF THE INVENTION

In accordance with the concepts of the present invention, a litter box liner is provided, which is in an envelope or pillowcase shape, such as that of a trash bag made of sheet or film material, and adapted to fit over a litter box. The envelope has a top sheet and a bottom sheet and has both sides and one end edge bonded together. The top sheet is provided with a layer of tear-resistant scratch and claw-proof material, such as a spun-bonded non-woven heat treated nylon material. Litter material is disposed on the layer of tear-resistant material. The envelope may be rolled off the litter box after use for easy disposal of the envelope, waste and litter material.

DETAILED DESCRIPTION OF THE INVENTION

Figure 1:
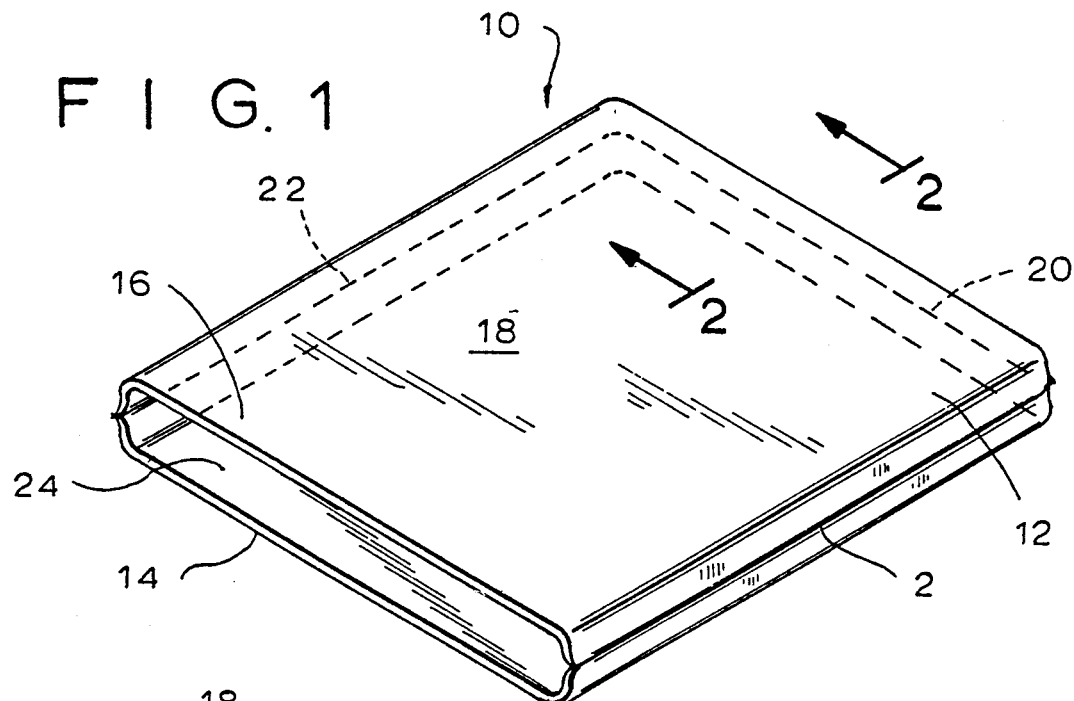
FIG. 1 is a plan view of the litter box envelope in accordance with the present invention.
Figure 2:
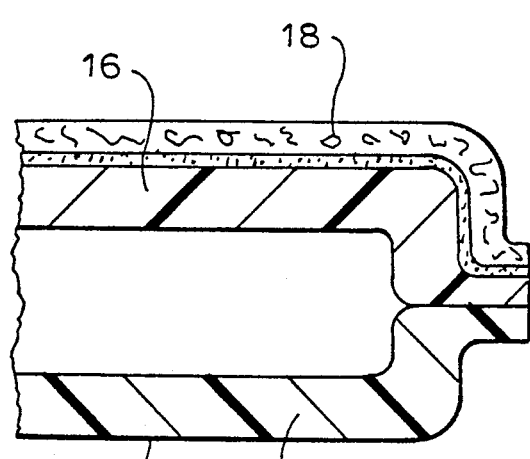
FIG. 2 is a sectional detail view, taken along the plane of line 22 in FIG. 1; and, FIG. 3 is a sectional view showing the envelope as mounted in a litter box.

With continuing reference to the accompanying drawing, wherein like reference numerals designate similar parts throughout the various views, reference numeral 10 generally designates the litter box envelope constructed in accordance with the concepts of the present invention.

The litter box envelope 10 includes an upper sheet 12 and a lower sheet 13 bonded along both side edges 14 and 16 and along the end edge 18 to each other. The other end edge 20 of the envelope is open.

A facing sheet 22 is bonded to the top sheet along the entire surface thereof. The top sheet 12 and bottom sheet 13 are formed of sheets made of polyethylene or polyurethane film and are very flexible and light in weight. The facing sheet 22, while also of a thin material, is extraordinarily tear resistant, also being cut, scratch and claw-proof to a remarkable extent. This material of the facing sheet 22 is formed of nylon fibers, which are spun-bonded and heat treated and, when bonded to the top sheet, forms an extremely flexible, lightweight envelope, which can be easily positioned over a litter box.

Figure 3:
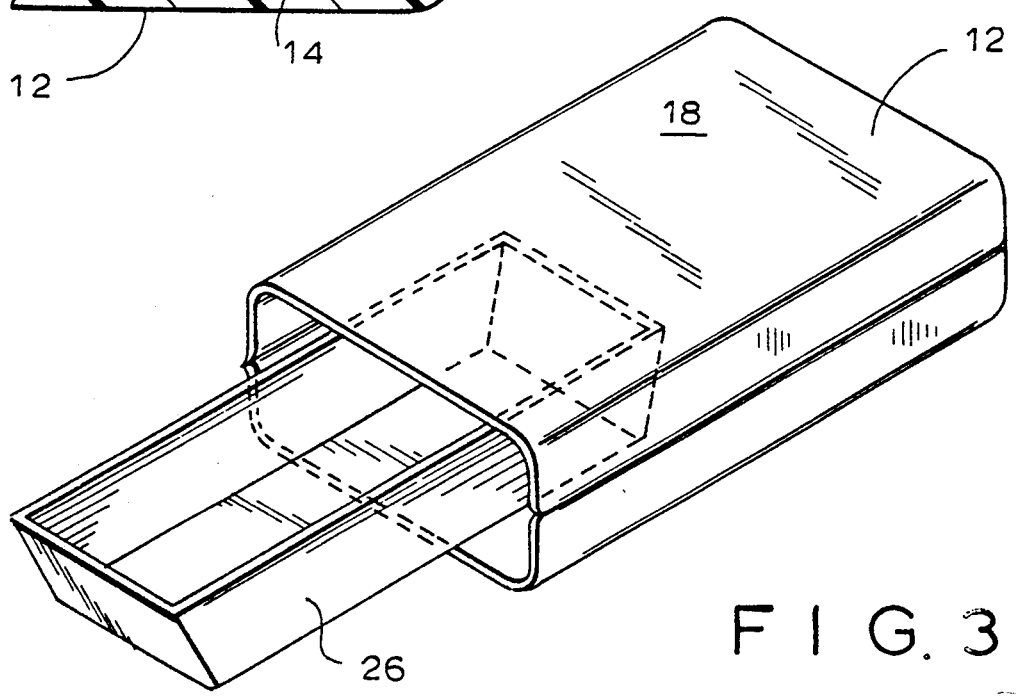
Figure 4:
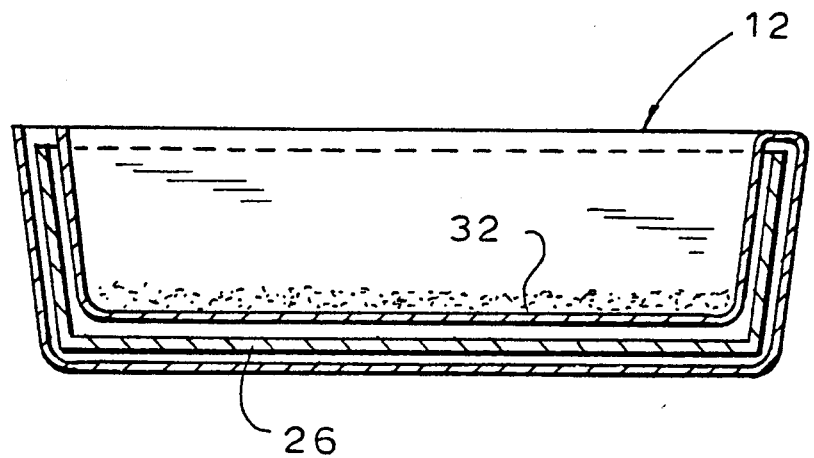
FIG. 4 is a sectional view showing the envelope as mounted in a litter box.
Figure 5:
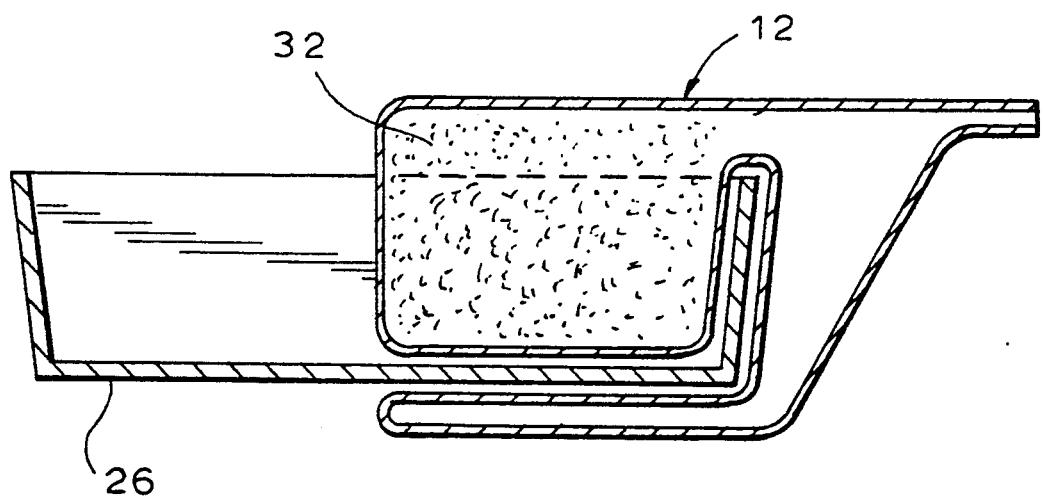
FIG. 5 is a sectional view showing disposal of the envelope.

As shown in FIG. 3, the envelope 10 is positioned over the litter box 26 with the bottom sheet 13 protecting the surface on which the litter box 26 rests. Litter material, such as sawdust, clay, ground stone, sand or other material is disposed on the facing sheet 22 within the well of the litter box 26. The litter material 30 and all waste material may be gathered within the envelope for disposal by simply rolling the envelope off the litter box 26 open end first.

While the envelope has been shown to be rectangular, it may be made in such shape (such as square) in order to conform to the shape of the litter box used and made of any suitable fluid impervious material.

The top sheet 12 and bottom sheet 13 are heat sealed, chemically bonded by solvents or adhesives or sonic welded along the side edges 14 and 16 and the end edge 18.

What is claimed is:

1. A litter box envelope for use in combination with a litter box received therein, comprising a top sheet and a bottom sheet bonded to each other along their side edges and an end edge of each thereof, a scratch proof, tear resistant facing sheet bonded to said top sheet, said facing sheet bonded to said top sheet, said facing sheet being formed of non-woven nylon fibers, which are spun bonded and heat treated, said bottom sheet being underneath said litter box, said top sheet being above said litter box.

2. A litter box envelope according to claim 1, wherein said bottom sheet is underneath said litter box, said top sheet being above said litter box, including litter material disposed on said facing sheet with said litter box.

* * * * *